US010121002B2

(12) United States Patent
Farjon et al.

(10) Patent No.: US 10,121,002 B2
(45) Date of Patent: Nov. 6, 2018

(54) DETECTING EXECUTABLE CODE WITHIN A DATA ENTITY

(71) Applicant: SOLEBIT LABS LTD., Herzliya (IL)

(72) Inventors: Meni Farjon, Ramat Gan (IL); Boris Vaynberg, Netanya (IL); Yossi Sara, Ramat-Gan (IL)

(73) Assignee: Solebit Labs Ltd., Herzliya (IL)

( * ) Notice: Subject to any disclaimer, the term of this patent is extended or adjusted under 35 U.S.C. 154(b) by 44 days.

(21) Appl. No.: 14/837,101

(22) Filed: Aug. 27, 2015

(65) Prior Publication Data

US 2016/0063247 A1 Mar. 3, 2016

Related U.S. Application Data

(60) Provisional application No. 62/044,252, filed on Aug. 31, 2014.

(51) Int. Cl.
G06F 21/56 (2013.01)

(52) U.S. Cl.
CPC .................. *G06F 21/562* (2013.01)

(58) Field of Classification Search
CPC ....... G06F 21/52–21/54; G06F 21/56–21/568; G06F 2221/033; H04L 63/14–63/145
See application file for complete search history.

(56) References Cited

U.S. PATENT DOCUMENTS

| 2006/0047958 A1* | 3/2006 | Morais | G06F 21/51 713/166 |
| 2008/0010538 A1* | 1/2008 | Satish | G06F 21/562 714/38.13 |
| 2009/0187992 A1* | 7/2009 | Poston | G06F 21/563 726/24 |
| 2010/0235913 A1* | 9/2010 | Craioveanu | G06F 21/563 726/23 |

* cited by examiner

Primary Examiner — Kevin Bechtel
(74) Attorney, Agent, or Firm — Soquel Group I.P Ltd.

(57) ABSTRACT

A method that includes receiving a data entity by the computer; storing the data entity in a first sector of the memory; wherein the first sector is isolated from another memory sector and executable code in the first sector is prevented from performing a write action to the other memory sector; generating, by the processor, an intermediate representation of the data entity; searching, by the processor, for an executable code that was not expected to be included in the data entity in the intermediate representation of the data entity; and when finding the executable code that was not expected to be included in the data entity then preventing a copying of the data entity to the other memory sector.

12 Claims, 10 Drawing Sheets

DETECTING EXECUTABLE CODE WITHIN A DATA ENTITY

RELATED APPLICATIONS

This application claims priority from U.S. provisional patent Ser. No. 62/044,252 filing date Aug. 31, 2014, which is incorporated herein by reference.

BACKGROUND OF THE INVENTION

For almost as long as people have used computers and networks, malware has existed attempting to compromise, subvert and damage these systems. In the beginning, viruses and worms spread through infected floppy disks and security holes in server-based applications.

With the rise of email and the web, executable files—spread mainly through email and files placed on websites—became a common way to trick users into installing malware on their systems.

These types of attacks were easy for somewhat savvy users and IT departments to avoid and stop. There was usually very little reason anyone would send an executable file through email. Users and businesses blocked or controlled the ability to transmit program files through email and network gateways, while still permitting file types they considered safe, such as Microsoft Word documents, images and other Office Suite files.

But over time documents and Office files changed. They were no longer simple static files with little potential for harm. Products like Microsoft Word and Adobe PDF added macro and advanced capabilities making it possible for documents to work in much the same way as executable programs, right down to the ability to run processes and install other bits of code on user systems.

If people didn't believe documents could be used to spread malware, a little virus named "Melissa" quickly changed their attitude. In 1999 the Melissa virus quickly spread across the Internet and in the process brought down networks and mail servers. Melissa spread by subverting the macro capabilities in Microsoft Word.

We've come a long way since Melissa. Modern document-based malware spreads in a variety of ways—not just through email but sometimes just by viewing the wrong website with the wrong browser and applications installed on your system.

These new types of document-based malware hide malicious payloads within the document itself. These executables and programs get launched separately by exploiting software vulnerabilities within the document and its reader software and continues to spread the malware infection throughout the user's system, these software vulnerabilities are often referenced as 'code execution vulnerabilities'.

Code execution vulnerability describe a software bug that gives an attacker a way to execute arbitrary code. A program that is designed to exploit such a vulnerability is called an arbitrary code execution exploit. Most of these vulnerabilities allow the execution of machine code and most exploits therefore inject and execute payload to give an attacker an easy way to manually run arbitrary commands.

An example of a network-based remote code execution vulnerability used in one of the most dangerous computer viruses known as Conficker, exploiting a vulnerability in the Server Service in Windows computers, using a specially-crafted RPC (remote procedure call) request to force a buffer overflow and execute shellcode on the target computer, gaining full control over it. In January 2009, the estimated number of Conficker infected computers ranged from almost 9 million to 15 million.

And while vendors continually try to patch these security holes malware writers use to spread their code, they are usually well behind the bad guys. Today, documents are one of the most common ways malware is spread across the Internet.

SUMMARY OF THE INVENTION

Systems, methods, non-transitory computer readable media for detecting executable code within a data entity.

According to an embodiment of the invention there may be provided a computer implemented method for protecting a computer from a data entity containing an executable code, the computer may include a memory and a processor, the method may include executing on the computer the steps of: receiving a data entity by the computer; storing the data entity in a first sector of the memory; wherein the first sector may be isolated from another memory sector and executable code in the first sector may be prevented from performing a write action to the other memory sector; generating, by the processor, an intermediate representation of the data entity; searching, by the processor, for an executable code that was not expected to be included in the data entity in the intermediate representation of the data entity; and when finding the executable code that was not expected to be included in the data entity then preventing a copying of the data entity to the other memory sector.

The intermediate representation of the data unit may be a binary representation of the data unit.

The computer implemented method may include searching for one or more predefined execution flows in the binary representation of the data unit; and when finding the one or more predefined execution flows in the binary representation of the data unit determining whether the one or more predefined execution flows form the executable code that was not expected to be included in the data unit.

The searching for the executable code that was not expected to be included in the data entity may include disassembling at least one portion of the binary representation of the data entity The searching for the executable code that was not expected to be included in the data entity may include finding one or more executable flow anchors; and disassembling one or more portions of the binary representation of the data entity that are proximate to the one or more executable flow anchors.

The searching for the executable code that was not expected to be included in the data entity may include searching for partially decoded representations of the one or more executable code anchors.

When an executable flow anchor of the one or more executable flow anchors may be a jump command for jumping to a given portion of the binary representation of the data entity then disassembling the given portion of the binary representation of the data entity.

The data unit may be generated by a first software (for example—WORD, PDF reader or generator, EXCEL). The generation of the binary representation of the data entity may be executed by a second software that has a security level that exceeds a security level of the first software.

The computer implemented method may include detecting a type of the data entity and selecting a process for generating the binary representation of the data entity in response to the type of the data entity.

The computer implemented method may include preventing a transmission of the data entity to a destination of the data entity when it may be determined that the one or more executable flows belong to an executable code.

According to an embodiment of the invention there may be provided a non-transitory computer readable medium may store instructions that once executed by the computer cause the computer to receive a data entity; store the data entity in a first sector of a memory of the computer; wherein the first sector may be isolated from another memory sector and executable code in the first sector may be prevented from performing a write action to the other memory sector; generate, by a processor of the computer, an intermediate representation of the data entity; search, by the processor of the computer, for an executable code that was not expected to be included in the data entity in the intermediate representation of the data entity; and when finding the executable code that was not expected to be included in the data entity then preventing a copying of the data entity to the other memory sector.

The intermediate representation of the data unit may be a binary representation of the data unit.

The non-transitory computer readable medium may store instructions for searching for one or more predefined execution flows in the binary representation of the data unit; and when finding the one or more predefined execution flows in the binary representation of the data unit determining whether the one or more predefined execution flows form the executable code that was not expected to be included in the data unit.

The searching for the executable code that was not expected to be included in the data entity may include disassembling at least one portion of the binary representation of the data entity.

The searching for the executable code that was not expected to be included in the data entity may include finding one or more executable flow anchors; and disassembling one or more portions of the binary representation of the data entity that are proximate to the one or more executable flow anchors.

The searching for the executable code that was not expected to be included in the data entity may include searching for partially decoded representations of the one or more executable code markers.

The when an executable flow anchor of the one or more executable flow anchors may be a jump command for jumping to a given portion of the binary representation of the data entity then disassembling the given portion of the binary representation of the data entity.

The data unit may be generated by a first software. The generation of the binary representation of the data entity may be executed by a second software that has a security level that exceeds a security level of the first software.

The non-transitory computer readable medium may store instructions for detecting a type of the data entity and selecting a process for generating the binary representation of the data entity in response to the type of the data entity.

The non-transitory computer readable medium may store instructions for preventing a transmission of the data entity to a destination of the data entity when it may be determined that the one or more executable flows belong to an executable code.

BRIEF DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Figure 1:
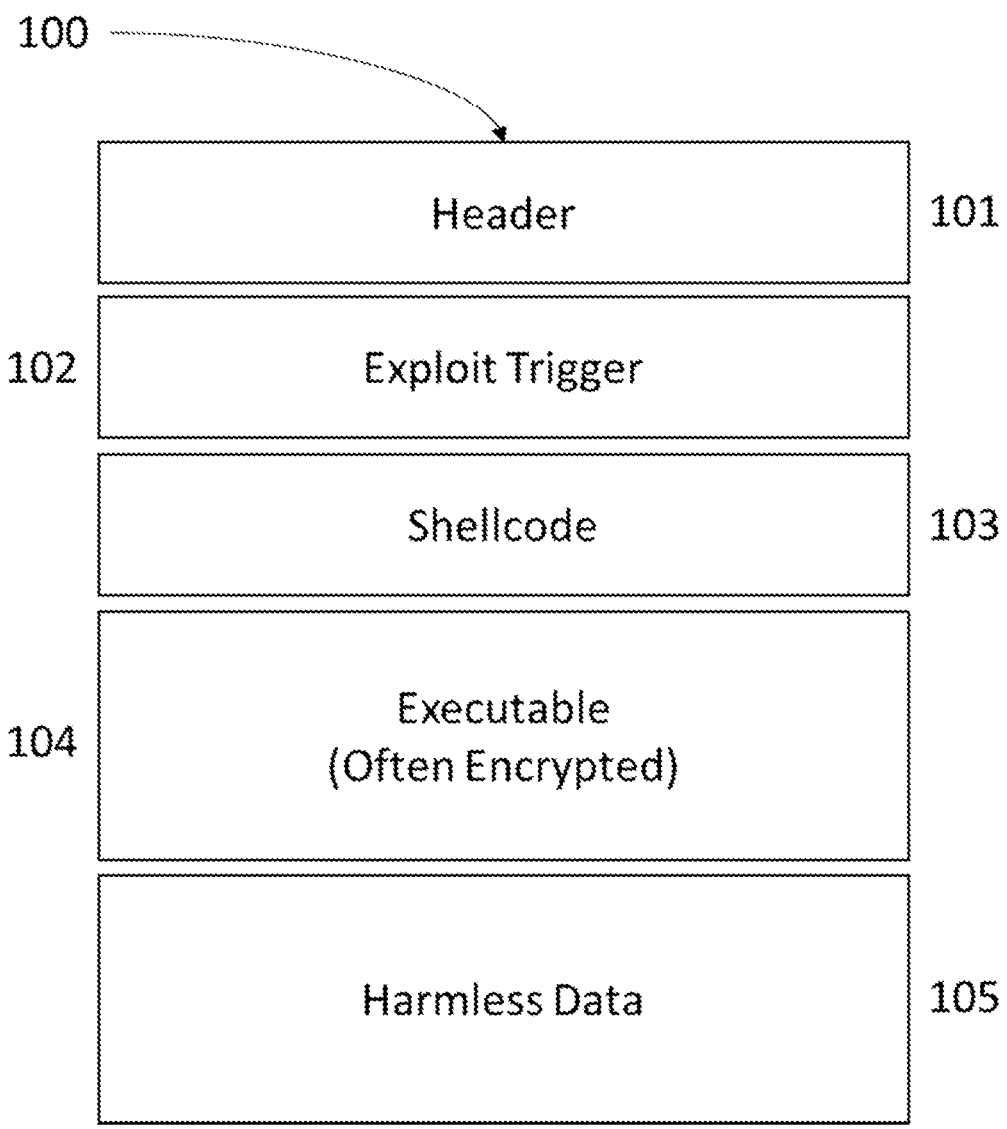

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method. Any system referred to in this specification is a computerized system that has a hardware processor and a hardware memory.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 2:
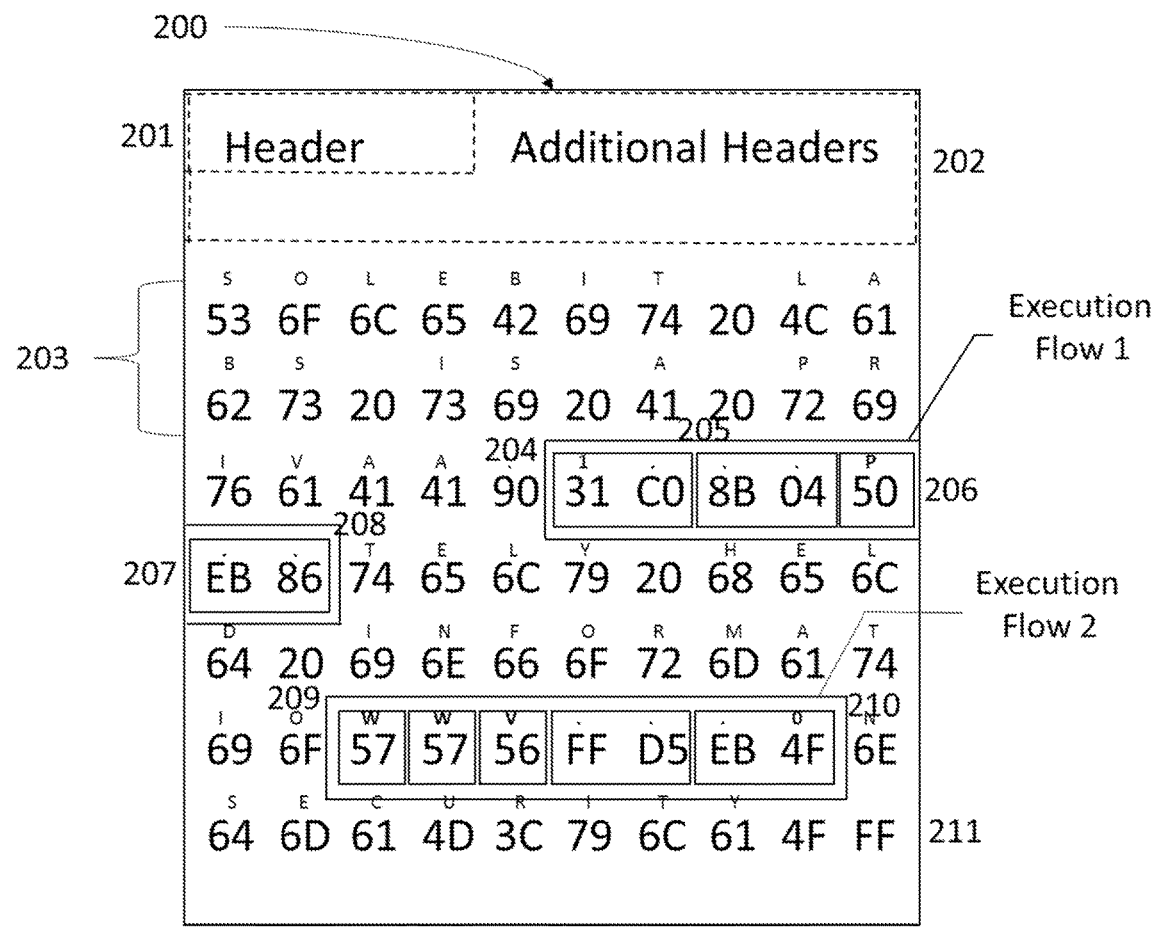
Figure 3:
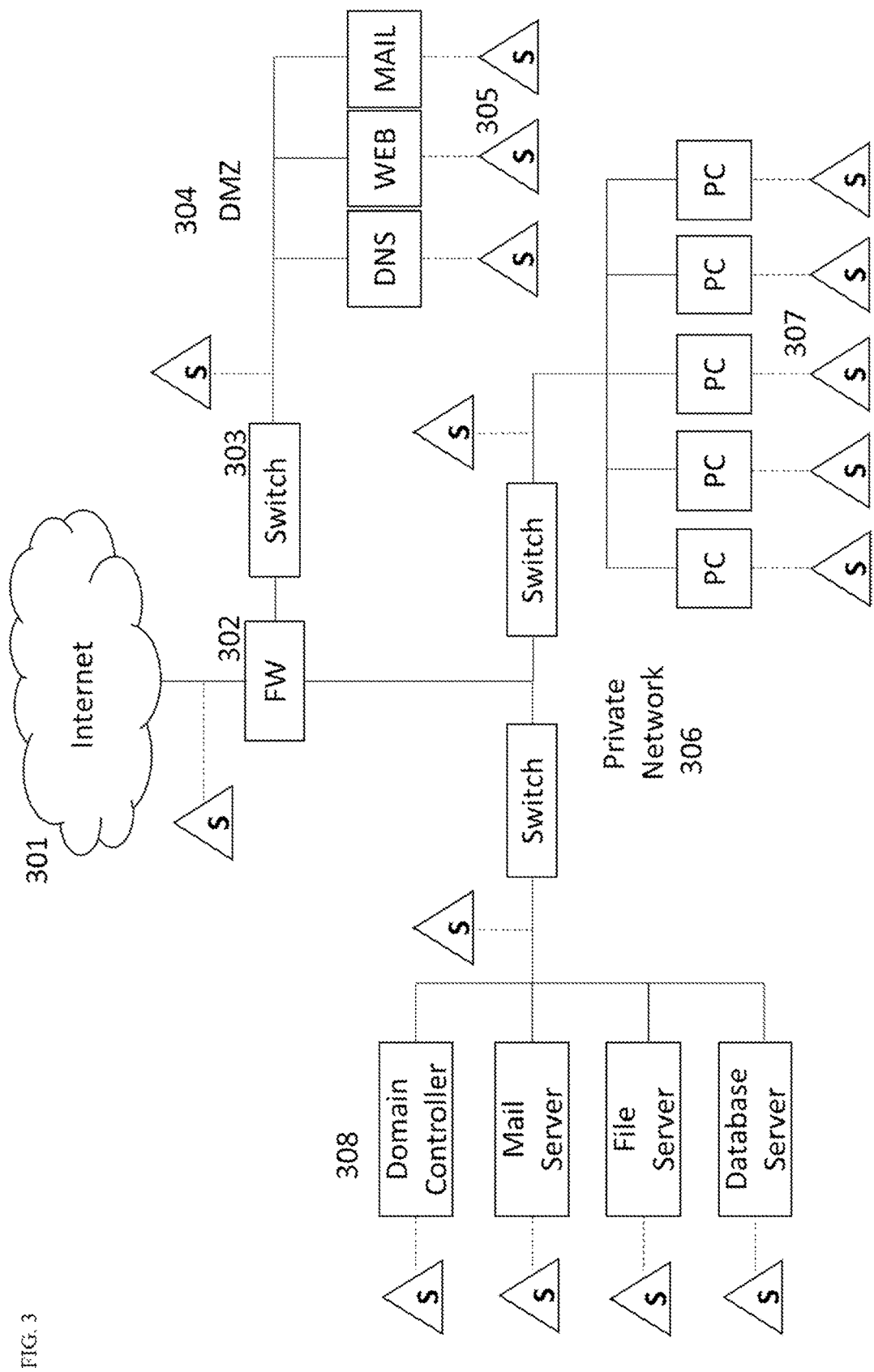
Figure 4:
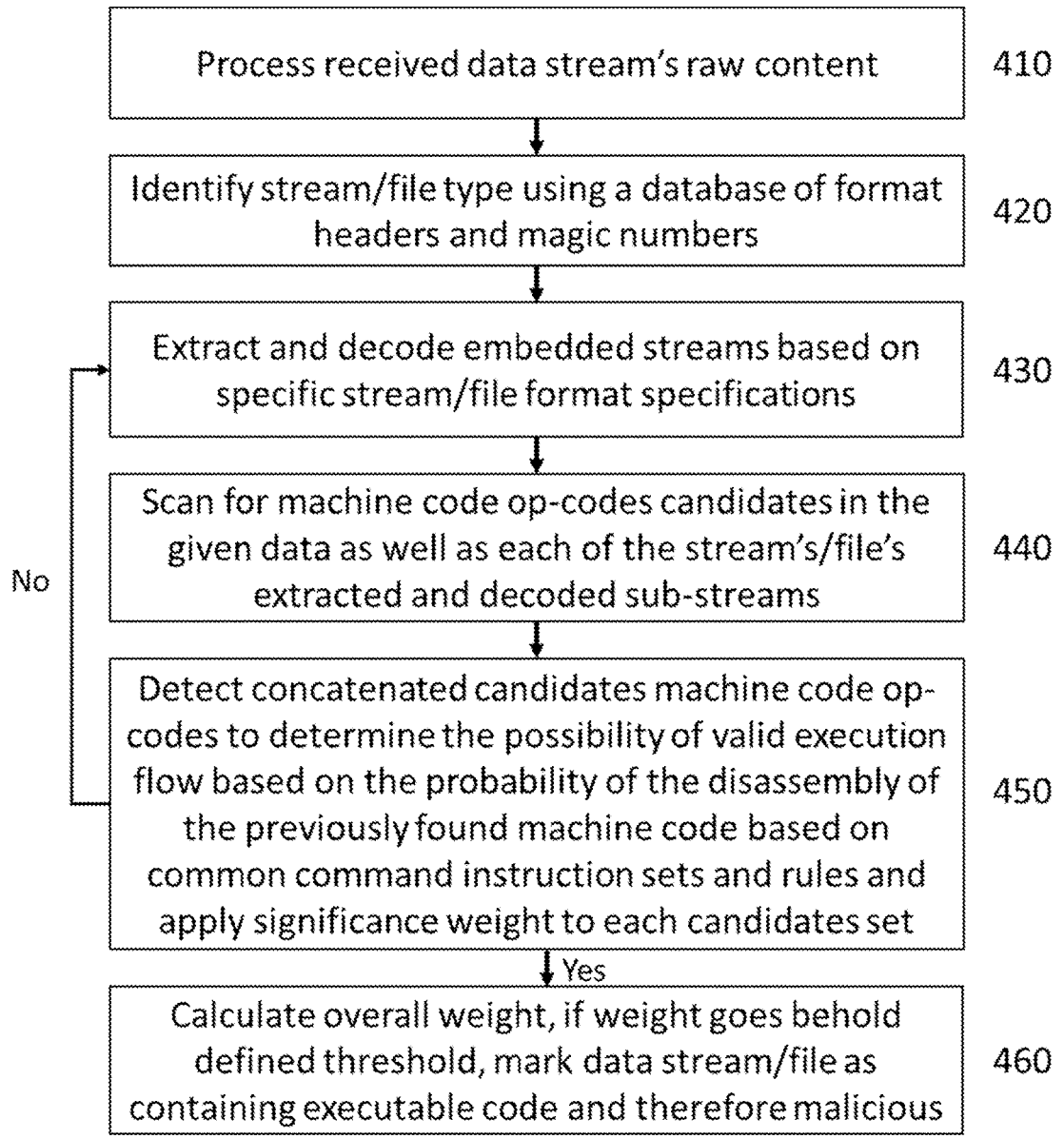
Figure 5:
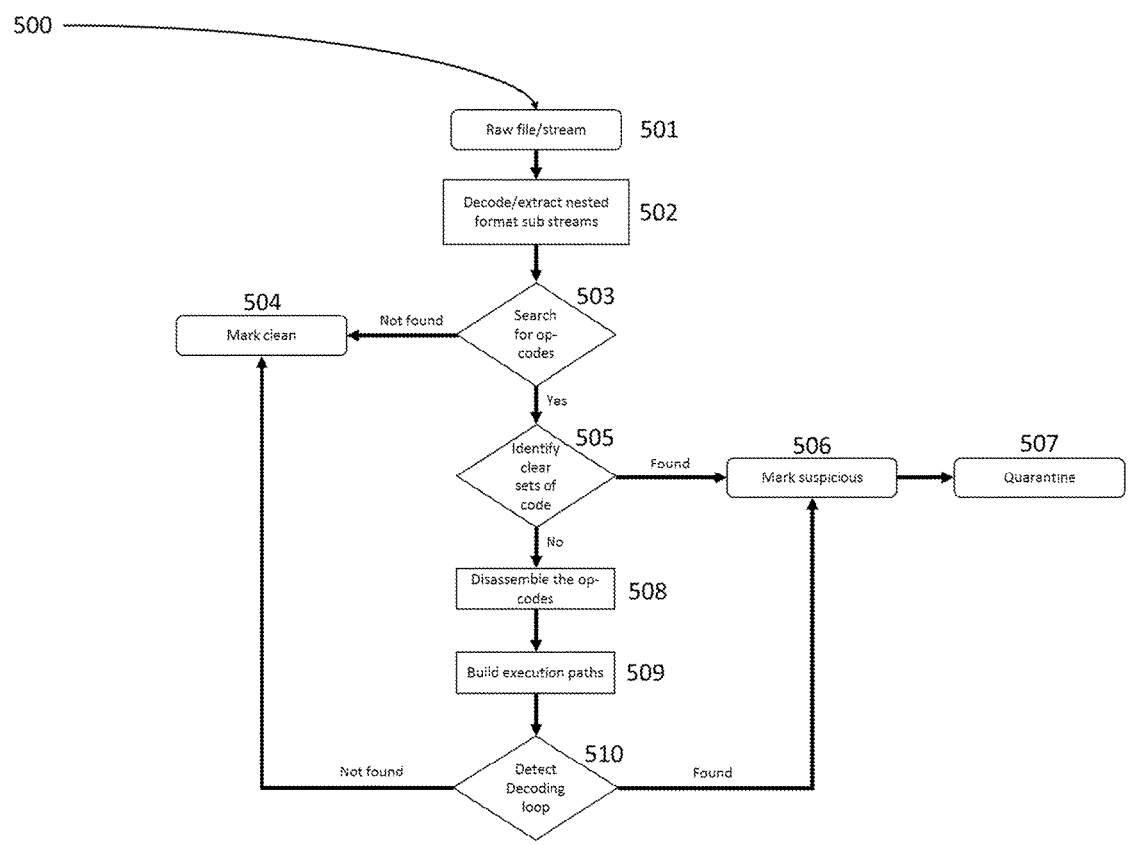
Figure 6:
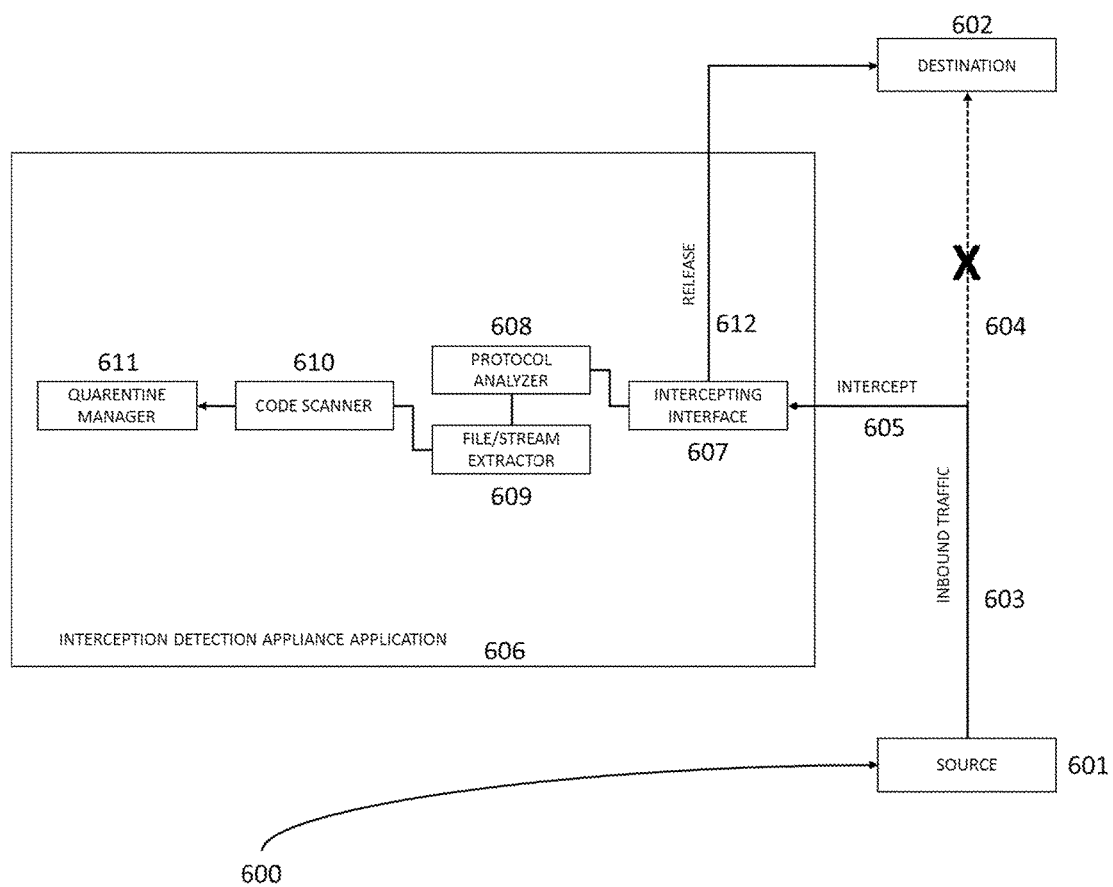
Figure 7:
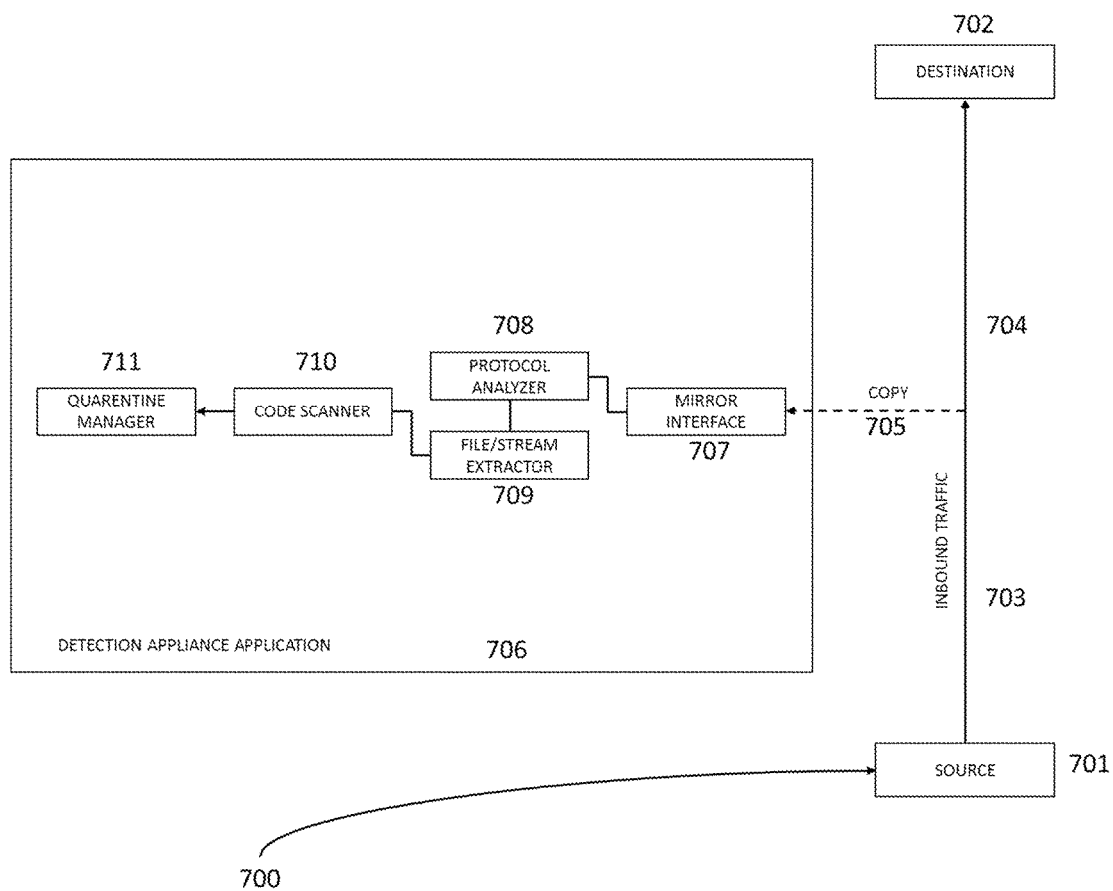
Figure 8:
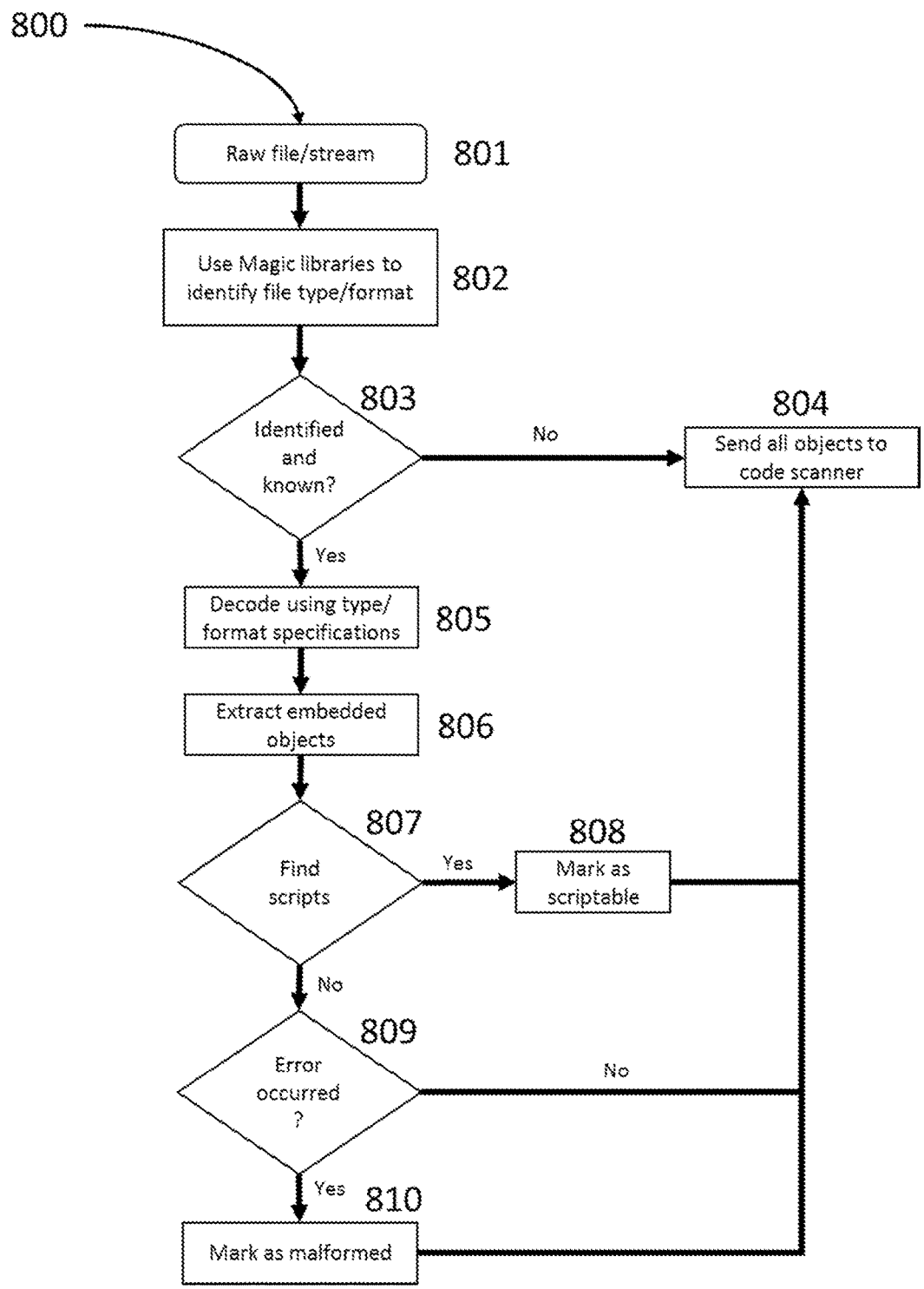
Figure 9:
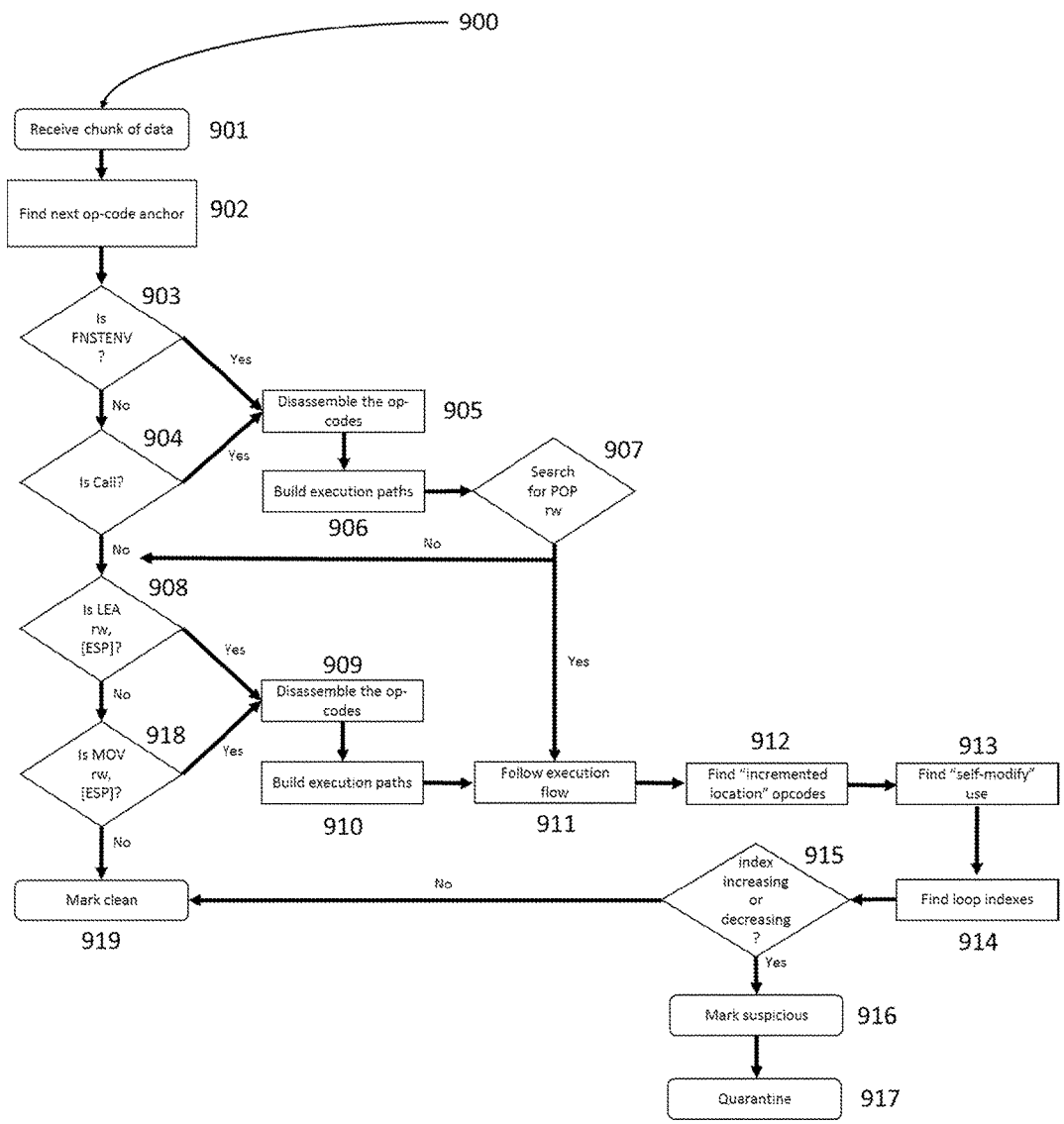
Figure 10:
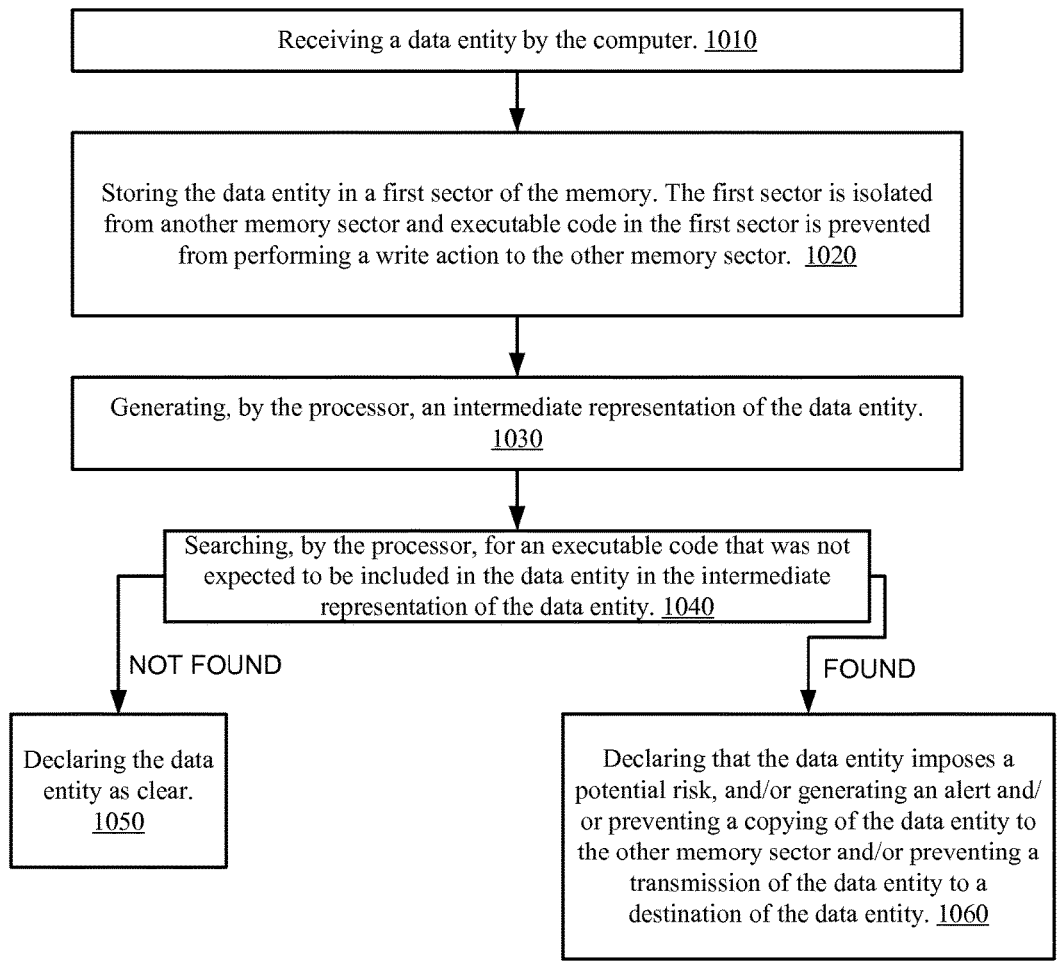

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIG. 1 is a simplified end-view of a malicious data file's common structure, containing headers and data streams as well as code sections;

FIG. 2 is an illustration of a hexa-decimal view of a data-type file, containing headers and data streams as well as code sections and executable code regions;

FIG. 3 illustrates a computer network and advisable appliance connection points according to various embodiments of the invention;

FIG. 4 is a flowchart of one or more data flow and code detection methods according to an embodiment of the invention;

FIG. 5 is a flowchart of operational and decision based methods according to an embodiment of the invention;

FIG. 6 illustrates an interception appliance application of FIG. 4, intercepting traffic from a source to a destination in accordance with an embodiment of the invention;

FIG. 7 illustrates a detection appliance application of FIG. 4, transparently copying traffic from a source to a destination in accordance with an embodiment of the invention;

FIG. 8 is a flowchart of a method according to an embodiment of the invention;

FIG. 9 is a flowchart of a method according to an embodiment of the invention; and FIG. 10 is a flowchart of a method according to an embodiment of the invention.

DETAILED DESCRIPTION OF THE INVENTION

There are provided methods for detecting machine executable code regions residing inside data-type files and network streams in order to determine malicious intent of non-executable files/streams, creating 'no code' network zone, applying significance weight based on statically locating defined sets and rules of processor-like workflows including default and possibly malicious machine instruction sets to successfully determine the possibility of a valid executable code and thus filtering out potentially malicious threats.

There are provided methods and systems for detecting presence of executable code from within data units such as data streams and fata files, as where there should be no executable code what-so-ever, and therefor distinguishing between code and data segments by locating executable CPU command, that could be executed, under any condition, by the processor of any type.

Provided the fact that data-type streams should only contain streams of data, one can eliminate all possible conditions on which a data file or a stream containing executable code from ever reaching the internal network, creating a logical barrier by filtering out those possibly malicious files and streams.

Considering the fact that every data-type stream is readable only by its supported reader software (Adobe Reader, Microsoft Office readers), which in most cases runs on the client's workstation/device, it is true to say executable processor code should only be located in those corresponding readers, which in turn process the data-type files, in some cases with unique decoding and compression techniques, to read, parse and display those data items.

If the stream in question contains an encoded portion, a decoder will attempt to decode the stream into a readable state.

Using a database of CPU (Central Processing Unit) commands op-codes (Operation Codes), fingerprints and disassembly techniques, one can evaluate the possibility of an executable code being present at any given location within a data stream.

These portions of a machine language instruction that specifies the operation to be performed, which should be present at the file in question in case it contains any code to be executed under any condition are referenced as 'opcodes'.

Specifications and format of the opcodes are laid out in the instruction set architecture (ISA) of the processor in question, which may be a general CPU or a more specialized processing unit. Apart from the opcode itself, an instruction normally also has one or more specifiers for operands (i.e. data) on which the operation should act, although some operations may have implicit operands, or none at all. There are instruction sets with nearly uniform fields for opcode and operand specifiers, as well as others (the x86 architecture for instance) with a more complicated, varied length structure.

Depending on architecture, the operands may be register values, values in the stack, other memory values, I/O ports, etc., specified and accessed using more or less complex addressing modes. The types of operations include arithmetics, data copying, logical operations, and program control, as well as special instructions (such as CPUID and others).

Referring to FIG. 1, a data-type file's structure is being illustrated, containing a header block 101, header refers to supplemental data placed at the beginning of a block of data being stored or transmitted. It is vital that header composition follow a clear and unambiguous specification or format, to allow for correct parsing. Exploit trigger 102 takes advantage of a bug, glitch or vulnerability in order to cause code execution, or alter the way the program operates, overwriting a return address pointer on the stack, pointing it to shellcode 103 which in turn creates an executable memory region, copies (often encrypted) executable code 104 to the newly created memory and execute its code. Finally, harmless data 105 is shown to the user as expected. This possibly malicious data file could be blocked by detecting those executable code regions by means of the method of the invention inside the different blocks (shell code 103, executable code 104) which should not be present in any standard data file, therefore evading this possible penetration attempt.

FIG. 2 illustrates a data file 200 (or a represented network stream) that is shown in a hex-decimal form. Provided lines 203 represents data bytes containing harmless data, representing a text sentence as shown in text representation above it. A hex representation (0X90) 204 of a possible 'NOP' machine code which is usually present right between an exploit attempt and its corresponding payload code present at bytes sequence 205-207.

By converting byte sequence 205-207 to machine language op-codes, a possible flow of execution can be identified (xor eax eax, mox eax esi, push eax, jmp short), one can also identify a false text representation in this byte sequence (1 . . . p . . . ), these bytes does not contain a real definition of text but are useable as executable code. It is true to say, if an exploit was triggered at a point when the corresponding software reader process this (potentially) malicious file, at some point the victim's CPU could execute byte sequences 205-207 as executable code and therefore altering the normal execution flow.

Harmless data 208 follows byte sequences 205-207, these stream of bytes might not be convertible to machine op-codes and actually contains real text representation.

Another code section seems to begin at 209-210, where another sequence of bytes is convertible to possible machine code logical execution flow (push edi, push edi, push esi, call ebp, jmp short). In this case, a significance value was assigned to the following code to address the probability of an execution flow. In this example, following the flow of possible execution, it is clear that a function at the address of the EBP register is being called with its required parameters being pushed into the stack forming a very common command instruction set and therefor a very high significance value was accumulated to the following sequence. It is also true that this sequence of bytes hardly represent any text at all.

Additional harmless text is presented at 210-211 not containing any convertible machine code op-codes, showing harmless text to the unsuspecting user. By detecting those executable code regions by means of the method of the invention, and using the fact that these type of files/streams should contain data-type only characters, it is true to mark this file as possibly malicious.

The data file may be stored, during the execution of any method listed below, in a first memory sector that differs from and is isolated from another memory sector.

FIG. 3 illustrates a computer network and advisable appliance connection points according to various embodiments of the invention, using systems (denoted by triangle with an S symbol) according to an embodiment of the invention.

A computer network that includes a data center environment (308), a private workstations network (306,307), a demilitarized zone (304) and an internet connection gateway (301). The system is capable of protecting these network sections and hosts.

By deploying the system at 302 prior to the network's connection to the internet, it is possible to intercept a connection to and from the internet WAN containing executable code packets, identified by the methods of this system.

It is possible to deploy the system at the connection between the DMZ 304 section to its 303 switch, protecting this section from incoming attacks using the methods of this system. It is also possible to deploy the system as a host-based software on the servers of the DMZ section at 305, protecting these assets by intercepting connections and files based on an application level host intrusion protection architecture, using the methods of this system.

The system can be deployed prior to the gateway for the data center and private network environments, similar to 303 and 302. Host-based protection can also be implemented on the systems of 308 and 307 similar to 305.

FIG. 4 illustrates a method 400 according to an embodiment of the invention.

At block 410, a data stream or a file in question is being processed by the system of this invention.

At block 420, a stream/file identification subsystem tries to identify the stream/file's type and format using publicly available file type identification libraries such as but not limited to "libmagic". The library handles the loading of database files that describe the magic numbers used to identify various file types, as well as the associated mime types. The library also handles character set detections and outputs the file/stream's format and type.

Using the result gathered from the file type identification module, at block 430 a matching decoder will use publicly available tools and techniques in an attempt to parse and decode additional embedded streams, objects and default encryption, embedded scripts and compression algorithms used in many different file types and formats to further reveal embedded, compressed or encrypted additional files and streams to be scanned for code. If the matched decoder returns a flag that identified embedded executable scripts such as but not limited to office macros, java script, python scripts and visual basic scripts, the stream or file in question is then marked as containing code (described in FIG. 8).

The publicly available tools and techniques may be selected to have a higher security level than the software (for example WORD, EXCEL, PDF, ZIP and the like) used to create and/or fully parse the data streams.

At block 440 one or more candidate areas within a data stream or a file is being scanned for its content in a binary form and includes scanning the data to determine if they contain adjacent repetitive instructions (that form execution flows) that are potentially intended to execute code in some conditions. An execution flow is a sequence of opcodes. There may be provided a predefined list of sequences of opcodes that form execution flows and the method may include searching in the binary format these predefined execution flows.

At block at 450 an attempt to combine these candidates using a disassembly engine implemented in the system to form an execution flow and compare to a data base of common machine instruction patterns and logics. Once a pattern is matched at 450, the location in the file in question is being marked as containing valid execution flow. At block 460, a calculation method calculates each previously detected execution flow and applies weight based on common command instruction sets and rules. Longer and meaningful execution flows applies heavier weight. The weight assigned to each execution flow may be predetermined and reflect the chances that the execution flow belongs to an executable code.

Finally, if the total sum of all of the previously discovered execution flows accumulates to a number higher than a threshold (for example 0.5), the stream or file in question is marked as containing code, an alert is triggered and the file is either blocked or allowed into the network. Match weights are accumulated by using to following formula (or by any other formula):

$$w'_s = \frac{w_s + w_n}{1 + w_s w_n}$$

Where $w_s$ is the cumulative weight (initially 0), $w_n$ is an additional weight and $w_s'$ is the new cumulative weight.

Under the assumption that each individual match weights do not exceed 1 (or −1), the cumulative weight never exceeds 1 as well.

FIG. 5 illustrates a method according to an embodiment of the invention.

At block 501, a data stream or a file in question is being received.

In block 502, a stream/file identification subsystem that tries to identify the stream/file's type and format using publicly available file type identification libraries such as but not limited to "libmagic".

The library handles the loading of database files that describe the magic numbers used to identify various file types, as well as the associated mime types. The library also handles character set detections and outputs the file/stream's format and type.

A matching decoder will use publicly available tools and techniques in an attempt to parse and decode additional embedded streams, objects and default encryption, embedded scripts and compression algorithms used in many different file types and formats to further reveal embedded, compressed or encrypted additional files and streams to be scanned for code. If the matched decoder returns a flag that identified embedded executable scripts such as but not limited to office macros, java script, python scripts and visual basic scripts, the stream or file in question is then marked as containing code (described in FIG. 8).

Using the result gathered from the file type identification module, in block 503 one or more candidate areas within original and extracted data streams or a files are being scanned for content in a binary form. Using a pre-defined CPU specific dictionary and sets of common command instruction op-codes, the system of this invention begins scanning the file or stream in question for adjacent op-codes.

In case the system fails to reveal any op-codes, at block 504 the file/stream is then marked as clean and allowed into the network.

If the file contains any op-codes, the system at 505 first uses pattern matching algorithms to search for pre-defined sets of instructions and their relevant permutations.

One example of a pre-defined set is as follows: 'PUSH EBP|MOV EBP, ESP'. In this example a clear 'x86 calling convention' also known as 'cdecl x86 calling convention' that originates from the C programming language and is used by many C compilers for the x86 architecture is detected. Since this set of command instructions is very common and in fact present as a prologue for most code execution environments, this set is marked as an execution flow and a weight is being applied.

If the total threshold of all of the discovered execution flows accumulates to a number higher than a threshold (such as 0.5), at block 506 the stream or file in question is marked as containing code, an alert is triggered and the file is either blocked or allowed into the network and the file may be copied to an isolated 'Quarantined' zone as per block 507 for future release and evidence.

At block 508, if op-codes were previously detected at block 503 and 505 but no execution flow was found or the accumulated weight did not hit the threshold, an attempt to disassemble the op-codes is made and an execution path is built. The system uses available libraries to disassemble given opcodes (described in FIG. 9) and at block 509 tries build an execution path, parsing machine instructions specified for jumping to different locations. These instructions are usually prefixed by a J character such as but not limited to JNZ JZ JGE JP JNE JNZ. The system then performs the 'jump' and performs the disassembly from the destination offset in an attempt to possibly discover additional machine instructions and further build and enlarge the execution path as per block 509.

At block 510 the method attempts to discover machine code encoding patterns and self-modifying code in the stream/file using the methods explained in FIG. 9.

If an encoding or self-modifying code pattern was revealed, the stream or file in question is marked as containing code as per block 506, an alert is triggered and the file is either blocked or allowed into the network and the file may be copied to an isolated 'Quarantined' zone as per block 507 for future release and evidence.

In case no encoding or self-modifying code patterns were revealed, the file or stream in question is being marked as clean as per block 504.

FIG. 6 illustrates a functional diagram of the interception appliance application of FIG. 4, intercepting traffic from a source to a destination in accordance with one embodiment of the present invention.

Source network node at 601 attempts to transfer data to a destination node 602.

Inbound traffic 603 towards the destination 602 is being intercepted, not directly reaching the destination as shown in 604, but instead directed at 605 to the interception detection appliance application at 606.

The traffic is intercepted by the Intercepting Interface at 607, where the data is being assembled by the Protocol Analyzer at 608, which in turn identifies the network protocol in use by the source and destination application using a pre-defined database of the system-supported protocols as per deployment.

The Protocol Analyzer assembles the network packets using publicly available tools and passes the data to the File/Stream extractor at 609. This module supports the identification subsystem that tries to identify the stream/file's type and format using publicly available file type identification libraries such as but not limited to "libmagic".

The library handles the loading of database files that describe the magic numbers used to identify various file types, as well as the associated mime types. The library also handles character set detections and outputs the file/stream's format and type. Using the result gathered from the file type identification module, the extracted, embedded and decoded objects are being passed to the Code Scanner at 610.

If code is detected by the use of the methods of this system as described in FIG. 4 and FIG. 5, the network stream or file in question is marked as containing code, an alert is triggered and the file is either blocked or allowed into the network and the file may be copied to an isolated 'Quarantined' zone as per block 611 for future release and evidence. If no code was found by the methods of this system as described in FIG. 4 and FIG. 5, the network stream is being released at 612 to the destination at 602, without altering any of the stream's data.

FIG. 7 illustrates a functional diagram of the detection appliance application of FIG. 4, transparently copying traffic from a source to a destination in accordance with one embodiment of the present invention.

Source network node at 701 attempts to transfer data to a destination node 702. Inbound traffic 703 towards the destination 702 is being transparently copied at 705, while reaching the destination as shown in 704.

The copied network traffic is being directed to the detection appliance application at 706. The traffic is copied by the Mirror Interface at 707, where the data is being assembled by the Protocol Analyzer at 708, which in turn identifies the network protocol in use by the source and destination application using a pre-defined database of the system-supported protocols as per deployment.

The Protocol Analyzer assembles the network packets using publicly available tools and passes the data to the File/Stream extractor at 709. This module supports the identification subsystem that tries to identify the stream/file's type and format using publicly available file type identification libraries such as but not limited to "libmagic". The library handles the loading of database files that describe the magic numbers used to identify various file types, as well as the associated mime types. The library also handles character set detections and outputs the file/stream's format and type. Using the result gathered from the file type identification module, the extracted, embedded and decoded objects are being passed to the Code Scanner at 710.

If code is detected by the use of the methods as described in FIG. 4 and FIG. 5, the network stream or file in question is marked as containing code, an alert is triggered and the file may be copied to an isolated 'Quarantined' zone as per block 711 for future release and evidence. No blocking of the stream can occur in this topology since it described transparent mirror/tap interface, where merely a copy of the data is being scanned.

FIG. 8 illustrates method 800 according to an embodiment of the invention.

At block 801, a data stream or a file in question is being processed by the system of this invention.

At block 802, a stream/file identification subsystem tries to identify the stream/file's type and format using publicly available file type identification libraries such as but not limited to "libmagic". The library handles the loading of database files that describe the magic numbers used to identify various file types, as well as the associated mime types.

The library also handles character set detections and outputs the file/stream's format and type. In most cases, it is possible to identify an arbitrary file's format using its dedicated file header and extension. The metadata contained in a file header are usually stored at the start of the file, but might be present in other areas too, often including the end, depending on the file format or the type of data contained.

Character-based (text) files usually have character-based headers, whereas binary formats usually have binary headers, although this is not a rule. Text-based file headers usually take up more space, but being human-readable they can easily be examined by using simple software such as a text editor or a hexadecimal editor.

File headers may contain metadata about the file and its contents. For example most image files store information about image format, size, resolution and color space, and optionally authoring information such as who made the image, when and where it was made, what camera model and photographic settings were used (Exif), and so on. Such metadata may be used by software reading or interpreting the file during the loading process and afterwards. File headers may be used by an operating system to quickly gather information about a file without loading it all into memory, but doing so uses more of a computer's resources than reading directly from the directory information.

For instance, when a graphic file manager has to display the contents of a folder, it must read the headers of many files before it can display the appropriate icons, but these will be located in different places on the storage medium thus taking longer to access.

A folder containing many files with complex metadata such as thumbnail information may require considerable time before it can be displayed.

At block 803, the result gathered from the file type identification module is then being compared to a pre-defined database of this system's known file types and formats. If the returned result does not match any of the known file types and formats, this subsystem, at block 804 passes the execution back to the code scanner, without altering of supplying and more data.

If a match is found, at block 805 and 806 a matching decoder will use publicly available tools and techniques in an attempt to parse and decode additional embedded streams, objects and default encryption, embedded scripts and compression algorithms used in many different file types and formats to further reveal embedded, compressed or encrypted additional files and streams to be scanned for code.

One example of such implementation is the ZIP compression, an archive file format that supports lossless data compression. .ZIP files are archives that store multiple files. .ZIP allows contained files to be compressed using many different methods, as well as simply storing a file without compressing it. Each file is stored separately, allowing different files in the same archive to be compressed using different methods. An identification of the file's header is as follows:

| ZIP file header | | |
|---|---|---|
| Offset | Bytes | Description |
| 0 | 4 | Local file header signature = 0x04034b50 (read as a little-endian number) |
| 4 | 2 | Version needed to extract (minimum) |
| 6 | 2 | General purpose bit flag |
| 8 | 2 | Compression method |
| 10 | 2 | File last modification time |
| 12 | 2 | File last modification date |
| 14 | 4 | CRC-32 |
| 18 | 4 | Compressed size |
| 22 | 4 | Uncompressed size |
| 26 | 2 | File name length (n) |
| 28 | 2 | Extra field length (m) |
| 30 | n | File name |
| 30 + n | m | Extra field |

By identifying these and other header definitions, it is possible to determine the file's type and compression used. The system will then use the appropriate publicly known decompression algorithm to decompress and reveal additional files and streams that are archived within the original zipped file.

At block 807 by using the above methods it is also possible to reveal indications of embedded executable scripts, mostly by parsing meta-data. If the matched decoder returns a flag that identifies embedded executable scripts such as but not limited to office macros, java script, python scripts and visual basic scripts, the stream or file in question is then marked as containing code as per block 808. If any error occurs when decoding a known file type or format, the file or stream is marked as "malformed" as per block 810. At any given time, any files and stream that were revealed by used the above methods are being passed to the code scanner as described in FIG. 4 and FIG. 5.

FIG. 9 illustrates a flowchart of method 900 according to an embodiment of the invention.

At block 901, a chunk of data assembling a stream or a file in question is being processed by the system of this invention.

At block 902, a search expression engine scans the chunk for pre-defined code artifacts (described as anchors) that can be disassembled for the following commands shown in blocks 903, 907, 908 and 920.

At block 903 and 904, the chunk is being scanned for anchor opcodes for the machine instructions FNSTENV and CALL as hex-decimal representation of 'D9' or 'E8' accordingly. If any of these opcodes is discovered in the chunk, a disassembly process is triggered for the followed a pre-defined number (for example but not limited to 200) bytes using a publicly available disassembler.

In essence, a disassembler is the exact opposite of an assembler. Where an assembler converts code written in an assembly language into binary machine code, a disassembler reverses the process and attempts to recreate the assembly code from the binary machine code. Since most assembly languages have a one-to-one correspondence with underlying machine instructions, the process of disassembly is relatively straight-forward, and a basic disassembler can often be implemented simply by reading in bytes, and performing a table lookup.

Given the disassembled followed 200 bytes, at block 906, a linker subsystem tries to build an execution path, locating machine instructions specified for jumping to different locations.

These instructions are usually prefixed by a J character such as but not limited to JNZ JZ JGE JP JNE JNZ. The system then performs the 'jump' and performs the disassembly for further 200 bytes from the destination offset in an attempt to possibly discover additional machine instructions and further build and enlarge the execution path.

While having a complete execution path, following conditional and unconditional branches, the system at block 907 scans the execution path for POP machine instruction. This instruction, while following a FNSTENV or CALL instructions the resulting value on the stack might represent the current location for IP (instruction pointer) and is often referenced as GETPC. An example of such set of instructions forming the mentioned flow might be as follows:
; GetPC using FSTENV technique
FLDPI
   FSTENV [ESP-0xC]
pop ebx; put address of FLDPI into ebx If no GETPC set of instructions was found, the system continues opcode anchor scan at block 908. If a GETPC set of instructions was found, the entire execution path is being followed to assemble one execution path with the GETPC sector at block 911 and is now referenced as candidate execution path.

At block 912, the final execution path is being scanned for "incremented location" machine instructions. This definition stands for incrementing a register that stores a location on the execution path. This register would mostly be the register holding the value returned from a GETPC sequence or the register SP (stack pointer). This technique is often used to place a pointer to the encoded candidate that follows a decoder stub that would usually be places a few bytes ahead. An example is as follows:
; GetPC using FSTENV technique+incremented location
FLDPI
FSTENV [ESP-0xC]
pop ebx; put address of FLDPI into ebx
add ebx, 46; increase ebx by 46–incremented location After validating an "incremented location", the block at 913 scans the remaining machine instructions for artifacts of self-modifying code. The indication for self-modifying code for this system refers to an arithmetic or logic operations performed on a register or number of registers that currently or previously held a location as discovered at block 912. Arithmetic or logic instructions stands for but not limited to XOR, AND, NOT, NEG, SHL, SHR, ADD, SUB, MUL, IMUL, DIV, IDIV, ADC, SBB, INC and DEC machine instructions. An example for a self-modifying machine code set is as follows:
; GetPC using FSTENV technique+incremented location+self-modification
FLDPI
FSTENV [ESP-0xC]
pop ebx; put address of FLDPI into ebx
add ebx, 46; increase ebx by 46–incremented location
xor [ebx], 4d; self-modification Once a self-modifying artifact is found, at block 914 and block 915 the system then scans the remaining machine instructions for loop incremented or decremented indexes. Incremented or decremented indexes stands for a registers that might be holding a loop-incremented or decremented value that is used to further point to a following offset in bytes that essentially decode a longer stub. The register holding this value would usually be incremented or decremented by the use of INC, DEC ADD or SBB instruction or else by the use of a LOOP instruction that will essentially decrease or increase the value on each executing loop. An example for an incremented/decremented index is as follows:

; GetPC using FSTENV technique+incremented location+self-modification+; decremented index
FLDPI
FSTENV [ESP-0xC]
pop ebx; put address of FLDPI into ebx
add ebx, 46; increase ebx by 46–incremented location
mov cl, 9; index
xor [ebx+cl], 4d; self-modification
dec cl; decremented index
loop label(xor); loop back to xor If an incremented or decremented loop index is found, the chuck is marked as containing code as per block 916, an alert is triggered and the file is either blocked or allowed into the network and the file may be copied to an isolated 'Quarantined' zone as per block 917. If no incremented or decremented loop index was found, and no other anchors exists, the chunk is marked as clean as per block 919, no alert is triggered and the file is allowed into the network.

If no FNSTENV or CALL machine instruction opcodes are found, the system at 908 and 918 scans the chunk for pre-defined code artifacts (described as anchors) that can be disassembled LEA rw, [ESP] and MOV rw, [ESP] instructions as hex-decimal representation of '8D 44 5C 4C' or '89 E0 E1 E2' accordingly.

If any of these opcodes is discovered in the chunk, a disassembly process is triggered for the followed 200 bytes using a publicly available disassembler in block 909.

At block 910, a linker subsystem tries to build an execution path, locating machine instructions specified for jumping to different locations. These instructions are usually prefixed by a J character such as but not limited to JNZ JZ JGE JP JNE JNZ. The system then performs the 'jump' and performs the disassembly for further 200 bytes from the destination offset in an attempt to possibly discover additional machine instructions and further build and enlarge the execution path. While having a complete execution path, following conditional and unconditional branches, the system of this invention performs the same steps described in this fig as for blocks 911, 912, 913, 914, 915, 916, 917 and 919 accordingly.

Finally, if none of the pre-defined op-code anchors were found in the chunk in question, the chunk is marked as clean as per block 919, no alert is triggered and the file is allowed into the network.

FIG. 10 illustrates method 1000 according to an embodiment of the invention.

Method 1000 is a computer implemented method for protecting a computer from a data entity containing an executable code. The computer includes a memory and a processor/

Method 1000 includes executing on the computer the steps of.

Step 1010 may include receiving a data entity by the computer. The data entity may be any type of electronic communication. It may be a file, multiple files, a part of a file, a data stream, multiple data streams, a packet, multiple packets, a frame, multiple frames and the like. The data unit may be any type of document that is created and/or parsed by data processors such as WORD™ of Microsoft™, USA, EXCEL™, OPEN OFFICE™, POWER POINT™, text document, and the like.

The 'sanitized' or 'clear' data unit may not include any executable code. Alternatively, some (usually predefined) executable codes may be allowed (allowed macros and the like).

Method 1010 aims to find an executable code within the data entity—an executable code that was not expected to be found in the data entity. When no executable code should be included in the data entity any executable code is not expected to be included in the data entity. When some predefined executable code may be found in the data unit then executable code that differs from the predefined executable code may not be expected to be found in the data entity.

Step 1010 may be followed by step 1020 of storing the data entity in a first sector of the memory. The first sector is isolated from another memory sector and executable code in the first sector is prevented from performing a write action to the other memory sector. The first sector and the other memory sector may be a quarantined sector and a non-quarantined sector. The first sector and the other memory sector may belong to the same memory, to the same computer, to different memory modules and even to different computers. For example—the other memory sector may belong to a computer that is protected by a system (such as system S of FIG. 3) while the first sector may belong to the system. A memory sector may include one or more memory address ranges.

Step 1020 may be followed by step 1030 of generating, by the processor, an intermediate representation of the data entity. The intermediate representation of the data entity may be a partially parsed version of the data entity such as a binary representation of the data entity. For example, in a word compliant data entity that includes text—the intermediate representation will not include the text in a readable format.

The data unit was generated by first software (for example—a text processor). Step 1030 may be executed using second software (such as a publically available open code and trusted software) that has a security level that exceeds a security level of the first software.

Step 1030 may include detecting a type of the data entity (DOC, PDF, ZIP, RTF and the like) and selecting a process for generating the binary representation of the data entity in response to the type of the data entity.

Step 1030 may be followed by step 1040 of searching, by the processor, for an executable code that was not expected to be included in the data entity in the intermediate representation of the data entity. In a data entity that should not include any executable code any executable code is not expected to be found.

When such executable code is not found then step 1040 may be followed by step 1050 of declaring the data entity as clear.

When such executable code is not found then step 1040 may be followed by step 1060 of declaring that the data entity imposes a potential risk, and/or generating an alert and/or preventing a copying of the data entity to the second sector and/or preventing a transmission of the data entity to a destination of the data entity.

Step 1040 may include at least some of the following:
a. Searching for one or more predefined execution flows in the binary representation of the data unit.
b. When finding the one or more predefined execution flows in the binary representation of the data unit—determining whether the one or more predefined execution flows form the executable code that was not expected to be included in the data unit.
c. Disassembling at least one portion of the binary representation of the data entity.
d. Finding one or more executable flow anchors.
e. Disassembling one or more portions of the binary representation of the data entity that are proximate to the one or more executable flow anchors.
f. Searching for partially decoded representations of the one or more executable code markers.
g. When an executable flow anchor of the one or more executable flow anchors is a jump command for jumping to a given portion of the binary representation of the data entity—disassembling the given portion of the binary representation of the data entity.

The present invention allows the heretofore protect networks and hosts from malicious penetration attempts by using this system and methods of this system in different ways. Provided the fact that most of the enterprise network traffic consists of data only objects travelling in and out of the network, this invention, its system and the methods of this system can detect all possible conditions on which a data stream containing executable machine code ever reaches the network, creating a logical network barrier, circumventing possible threats to the network.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A computer implemented method for protecting a computer, the method comprising:
receiving by the computer, a data block entering a network;
detecting, by the computer, a type of the data block;
selecting a process for generating a binary representation of the data block based on the type of the data block;
generating, by the computer, a binary representation of the data block based on the selected process;
searching, by the computer, for anchors within the data block, wherein an anchor is a pre-defined code artifact that can be disassembled for a machine instruction from a specific set of instructions;
when said searching locates one or more anchors within the data block, then disassembling a pre-defined number of successive bytes of the data block following the anchors to discover additional machine instructions;
further searching, by the computer, for machine instructions in the data block for jumping to different locations within the data block;
following the jump instructions to the jump location, and further disassembling, by the computer, the pre-defined number of successive bytes of the data block to discover yet additional machines instructions;
attempting to build, by the computer, an execution path from the discovered machine instructions, comprising:
parsing the discovered machine instructions; and following the flow of the execution path, including conditional and unconditional branches of the parsed machine instructions, to validate or invalidate the execution path;

validating, by the computer, an incremented location by scanning a built execution path for machine instructions that increment a register that stores a location on the execution path;

finding, by the computer after validating the incremented location, a self-modifying artifact by scanning remaining machine instructions in the built execution path for an arithmetic or logic operation performed on a register that currently or previously held a location in the validated incremented location;

finding, by the computer after finding the self-modifying artifact, a modified loop index by scanning remaining machine instructions in the built execution path for registers that hold a loop value that is incremented or decremented;

preventing, by the computer, the data block from entering the network when a modified loop index is found.

2. The computer implemented method according to claim 1, comprising:

storing the data block in a first sector of a memory of the computer, wherein the first sector is isolated from other memory sectors, and executable code in the first sector is prevented from performing a write action to the other memory sectors.

3. The computer implemented method according to claim 1, further comprising checking whether the executable code was expected to be included in the data block.

4. The computer implemented method according to claim 3, further comprising:

finding one or more executable flow anchors; and disassembling one or more portions of the binary representation of the data block that are proximate to the one or more executable flow anchors, wherein the disassembling comprises recreating an assembly code from a binary machine code.

5. The computer implemented method according to claim 4 wherein the searching comprises searching for partially decoded representations of the one or more anchors.

6. The computer implemented method according to claim 1, wherein the data block was generated by a first software, and wherein said generating comprises generating a binary representation of the data block by a second software that has a security level that exceeds a security level of the first software.

7. The computerized method according to claim 1 wherein the validity of the execution path is based on significance values assigned to bytes of the data block in accordance with a probability that the bytes of the data block are executable codes.

8. A non-transitory computer-readable medium that stores instructions that, once executed by a computer, causes the computer to:

receive a data block entering a network;

detect a type of the data block;

select a process for generating a binary representation of the data block based on the type of the data block;

generate a binary representation of the data block based on the selected process;

search for anchors within the data block, wherein an anchor is a predefined code artifact that can be disassembled to a machine instruction from a specific set of instructions;

when the search locates one or more anchors within the data block, then disassemble a pre-defined number of successive bytes of the data block following the anchors, to discover additional machine instructions;

further search for machine instructions in the data block for jumping to different locations within the data block;

follow the jump instructions to the jump locations, and further disassemble the pre-defined number of successive bytes of the data block to discover yet additional machine instructions;

attempt to build, by the computer, an execution path from the discovered machine instructions, comprising:

parse the discovered machine instructions; and follow the flow of the execution path, including conditional and unconditional branches of the parsed machine instructions, to validate or invalidate the execution path;

validate an incremented location by scanning a built execution path for machine instructions that increment a register that stores a location on the execution path;

find, after validating the incremented location, a self-modifying artifact by scanning remaining machine instructions in the built execution path for an arithmetic or logic operation performed on a register that currently or previously held a location in the validated incremented location;

find, after finding the self-modifying artifact, a modified loop index by scanning remaining machine instructions in the built execution path for registers that hold a loop value that is incremented or decremented;

prevent the data block from entering the network when a modified loop index is found.

9. The non-transitory computer readable medium according to claim 8 that stores instructions for storing the data block in a first sector of a memory of the computer, wherein the first sector is isolated from other memory sectors and executable code in the first sector is prevented from performing a write action to the other memory sectors.

10. The non-transitory computer readable medium according to claim 8, wherein the non-transitory computer readable medium stores instructions for checking whether the executable code was expected to be included in the data block.

11. The non-transitory computer readable medium according to claim 8, wherein the data block was generated by a first software, and wherein the computer generates a binary representation of the data block by a second software that has a security level that exceeds a security level of the first software.

12. The non-transitory computer readable medium according to claim 8, wherein the validity of the execution path is based on significance values assigned to bytes of the data block in accordance with a probability that the bytes of the data block are executable codes.

* * * * *